United States Patent
Byron et al.

(10) Patent No.: US 10,592,819 B2
(45) Date of Patent: Mar. 17, 2020

(54) INSTRUCTION ELEMENT VARIABILITY (71) Applicant: International Business Machines Corporation, Armonk, NY (US)

(72) Inventors: Donna K. Byron, Petersham, MA (US); Carmine M. DiMascio, West Roxbury, MA (US); Florian Pinel, New York, NY (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 15/042,270

(22) Filed: Feb. 12, 2016

(65) Prior Publication Data
US 2017/0235810 A1    Aug. 17, 2017

(51) Int. Cl.
*G06N 20/00*    (2019.01)
*G06N 5/02*    (2006.01)

(52) U.S. Cl.
CPC ............. *G06N 20/00* (2019.01); *G06N 5/022* (2013.01)

(58) Field of Classification Search
CPC ............................... G06N 99/00; G06N 20/00
See application file for complete search history.

(56) References Cited

U.S. PATENT DOCUMENTS

| 8,419,433 B2 | 4/2013 | Do et al. |
| 2013/0149679 A1* | 6/2013 | Tokuda .................. A47J 36/321 434/127 |
| 2013/0183642 A1 | 7/2013 | Wan |
| 2014/0188566 A1 | 7/2014 | Pinel et al. |

OTHER PUBLICATIONS

Ahn, Yong-Yeol, et al., "Flavor network and the principles of food pairing", Scientific reports, 1, 196, 2011, 7 pages. (Year: 2011).*
Kim, Kyung-Joong, and Chang-Ho Chung, "Tell me what you eat, and I will tell you where you come from: A data science approach for global recipe data on the web", IEEE Access 4, 2016, pp. 8199-8211. (Year: 2016).*
Teng, Chun-Yeun, Yu-Ru Lin, and Lada Adamic, "Recipe recommendation using ingredient networks", Proc. 4th Annual ACM Web Sciences Conf., ACM, Jun. 2012, pp. 298-307. (Year: 2012).*
U.S. Appl. No. 15/187,813, entitled "Instruction Element Variability", filed Jun. 21, 2016.
IBM Appendix P, list of IBM patents or patent applications treated as related, pp. 1-2, dated Jun. 21, 2016.
"Method of identifying a dish type from a recipe", An IP.com Prior Art Database Technical Disclosure, Authors et. al.: Disclosed Anonymously, IP.com Number: 000242606, 2 pages.

* cited by examiner

*Primary Examiner* — Vincent Gonzalez
(74) *Attorney, Agent, or Firm* — Endicott Drafting Center (57) ABSTRACT

One or more processors receive one or more variations to one or more first instruction elements in a first instruction set that indicate one or more second instruction elements of a second instruction set. One or more processors determine whether the one or more first instruction elements exceed a threshold of variability. One or more processors determine whether the one or more first instruction elements and the one or more second instruction elements are substantially equivalent. One or more processors determine whether a first outcome of the first instruction set is substantially similar to a second outcome of the second instruction set.

13 Claims, 5 Drawing Sheets

INSTRUCTION ELEMENT VARIABILITY

BACKGROUND OF THE INVENTION

The present invention relates generally to the field of instruction variation impact, and more particularly to machine learning of instruction variation impact.

Instructions often include a list of one or more steps and components that enable the replication of a product or creation previously assembled by another. Improvements of the product or creation typically require variation of the instruction steps and components.

SUMMARY

Embodiments of the present invention provide a method, system, and program product to develop the machine learning of instruction variation impact. One or more processors receive one or more variations to one or more first instruction elements in a first instruction set that indicate one or more second instruction elements of a second instruction set. One or more processors determine whether the one or more first instruction elements exceed a threshold of variability. One or more processors determine whether the one or more first instruction elements and the one or more second instruction elements are substantially equivalent. One or more processors determine whether a first outcome of the first instruction set is substantially similar to a second outcome of the second instruction set.

DETAILED DESCRIPTION

A set of instructions or an instruction set typically include several instruction elements (i.e., steps, components, ingredients, etc.) that lead to an outcome (i.e., product, result, etc.). In a large corpus of instruction sets, the outcome of an instruction set is often characterized by a descriptor (i.e., title, tag, etc.) that, by custom or definition, determines that one or more of the instruction elements is essential. One scenario is the preparation of a food dish where the instruction set is a recipe, the instruction elements are the recipe steps (e.g., cooking, mixing, etc.) and ingredients (e.g., butter, sugar, milk, etc.), the outcome is a dish type typically indicated by the title of the recipe (e.g., eggplant parmigiana, Beef Wellington, chocolate mousse, etc.), and the corpus is a large collection of recipes (e.g., CHEF WATSON). In this scenario, there are typically essential recipe steps and/or ingredients (i.e., instruction elements) that, if changed significantly, result in a dish type (i.e., outcome) that no longer matches the title (i.e., descriptor). For example, a recipe with the title "Beef Wellington" requires the essential steps of baking beef inside a pastry shell because Beef Wellington, by custom and/or definition, is beef baked inside a pastry shell.

Certain instruction elements in a set of instructions from a plurality of instruction sets (i.e., a corpus of instruction sets) are considered critical because they cannot be varied significantly and still produce an essential trait that characterizes the outcome of the original instruction set in a fundamental way. In one scenario involving instruction set variation, a change to one or more ingredients and/or steps in a recipe can provide a dish of the same "type" as defined in a corpus of recipes, but with a different "twist." However, other variations will lead to the creation of a different type of dish, which again is defined in the corpus of recipes. For example, variations in the type of cheese used in the preparation of a soufflé produces different dishes that would still be characterized as soufflés in a corpus of recipes. In contrast, variation in the way the soufflé is cooked, such as frying the batter instead of baking the batter, produces a dish that is characterized as scrambled eggs instead of a soufflé in the corpus of recipes. Thus, baking a soufflé is a more critical instruction element (i.e., less of a variable instruction element) for the creation of a soufflé than varying the type of cheese used in the soufflé.

Another embodiment involving instruction element variation is a set of instructions for do-it-yourself (DIY) projects. In one example, an instruction set for painting wood furniture allows many variations for the instruction elements that describe the application of a coating substance on the wood surface. The instruction elements that describe tools to use when applying the coating includes brushes, cloths, rollers, etc. The use of any of these tools will still provide painted wood furniture. However, the instruction element describing the material used to coat the furniture does not allow variation from a non-transparent coating (i.e., paint) to a transparent coating (i.e., stain). The use of a transparent coating leads to an outcome characterized as stained wood furniture, not painted wood furniture.

Embodiments of the present invention are not limited to applications such as hobby and recipe instruction corpora/databases. Various embodiments of the present invention include any endeavor involving instruction sets in a database/corpus that contain instruction elements that are variable. In some embodiments, procedures involving a database of scientific experiments are included. In some scenarios, procedures (i.e., instructions) in chemistry and biology typically involve instruction elements that describe mixing reactants in solvents at a particular temperature and pressure. Many biological assays and chemical reactions have essential steps and/or components (i.e., instruction elements) that are characteristic of the type of assay or reaction being performed and cannot be varied substantially, if at all.

Embodiments of the present invention are not limited to the presence or absence of critical instruction elements. In some embodiments, the order in which the instruction elements are performed is critical for outcome type. For example, poached eggs and deviled eggs both require breaking egg shells and cooking with boiling water. However, the egg shells are broken prior to cooking with boiling water for poached eggs. In contrast, cooking with boiling water occurs prior to breaking egg shells for dishes characterized as deviled eggs.

Embodiments of the present invention recognize that instruction sets contain instruction elements that differ in variability depending on how the outcomes of the instruction sets are characterized in a database/corpus. Embodiments of the present invention provide a method, computer program product, and computer system to determine a degree of variability in a database of instruction elements depending on how the outcome of an instruction set is characterized.

The present invention will now be described in detail with reference to the Figures.

Figure 1:
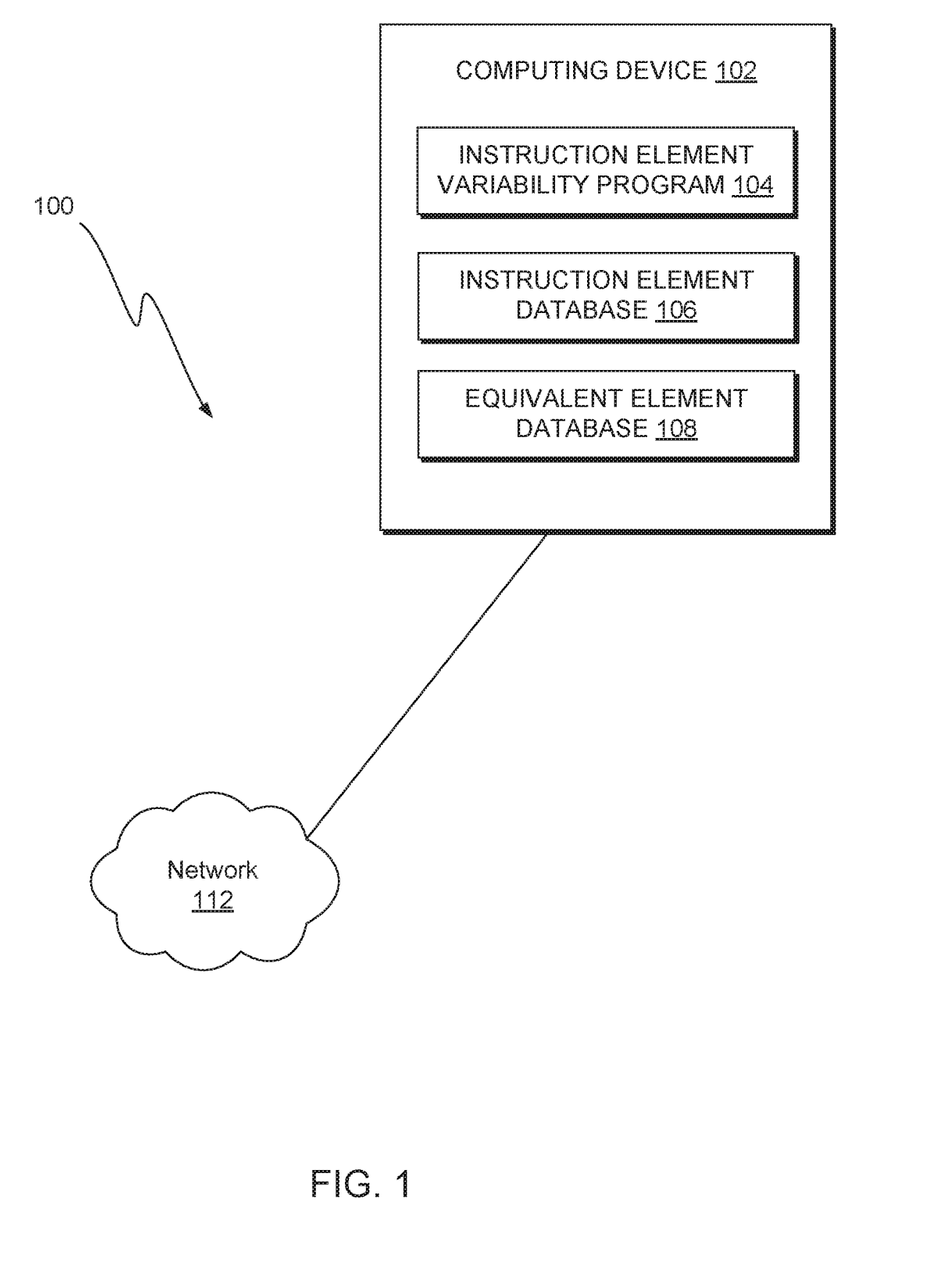
FIG. 1 is a functional block diagram illustrating an instruction element variability determination environment, in accordance with an exemplary embodiment of the present invention.

FIG. 1 is a functional block diagram illustrating an instruction element variability determination environment, generally designated 100, in accordance with one embodiment of the present invention. Instruction element variability determination environment 100 includes computing device 102 connected over network 112. Computing device 102 includes instruction element variability program 104, instruction element database 106, and equivalent element database 108.

In various embodiments of the present invention, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to instruction element variability program 104, instruction element database 106, and equivalent element database 108 and is capable of executing instruction element variability program 104. Computing device 102 may include internal and external hardware components, as depicted and described in further detail with respect to FIG. 4.

In this exemplary embodiment, instruction element variability program 104, instruction element database 106, and equivalent element database 108 are stored on computing device 102. However, in other embodiments, instruction element variability program 104, instruction element database 106, and equivalent element database 108 may be stored externally and accessed through a communication network, such as network 112. Network 112 can be, for example, a local area network (LAN), a wide area network (WAN) such as the Internet, or a combination of the two, and may include wired, wireless, fiber optic or any other connection known in the art. In general, network 112 can be any combination of connections and protocols that will support communications between computing device 102, instruction element variability program 104, instruction element database 106, and equivalent element database 108, in accordance with a desired embodiment of the present invention.

Figure 2:
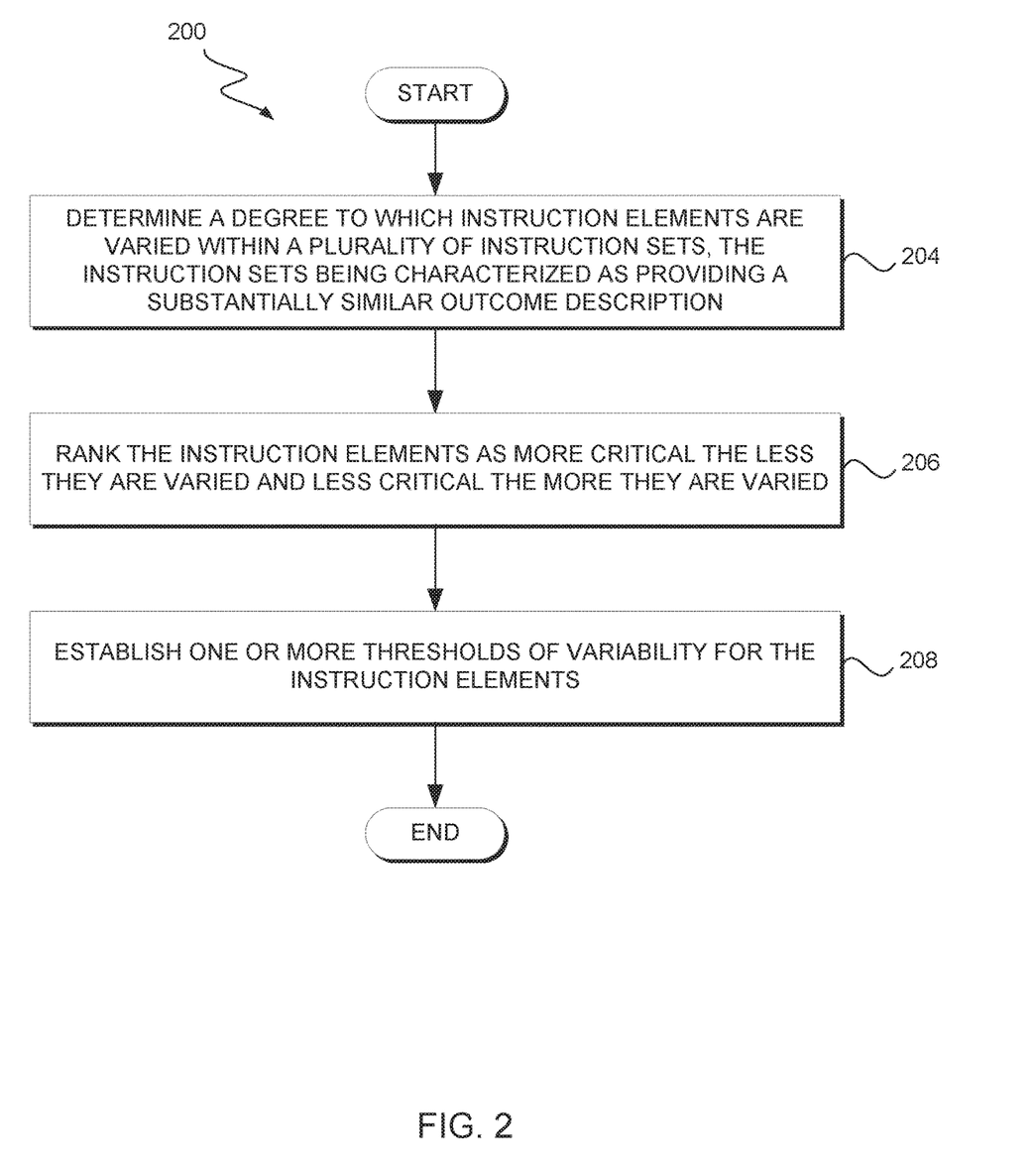
FIG. 2 illustrates operational processes for establishing one or more thresholds of variability for instructional elements within a plurality of instruction sets, on a computing device within the environment of FIG. 1, in accordance with an exemplary embodiment of the present invention.

In exemplary embodiments, instruction element variability program 104 establishes one or more thresholds of variability for instructional elements within a plurality of instruction sets as described in detail in FIG. 2. Instruction element variability program 104 also determines a degree to which one or more variations in a set of instructions makes an outcome of the varied set of instructions not substantially similar to the outcome of the unvaried set of instructions within the plurality of instruction sets (described in detail in FIG. 3).

In exemplary embodiments, instruction element database 106 is a database (i.e., corpus) that includes a plurality of instruction sets organized by outcome descriptors. The instruction sets within instruction element database 106 include instruction elements that describe, for example, conditions, material, components, etc. for steps within the instruction sets.

In exemplary embodiments, equivalent element database 108 is a database that includes lists of instruction elements that, for the usage of the instruction elements in an instruction set with a given outcome descriptor in instruction element database 106, are substantially equivalent elements. For example, in some recipes, milk and cream are substantially equivalent ingredients in equivalent element database 108, which are varied depending on the richness or calorie savings desired in the resulting food dish. In some cases, certain ingredients (e.g., milk, sugar, butter, flour, etc.) are critical for a dish in instruction element database 106, but variation of that critical ingredient is allowed with a substantially equivalent substitute ingredient (i.e., a substantially equivalent instruction element).

In various embodiments, equivalent element database 106 is constantly updated by instruction element variability program 104. Using a machine learning model, instruction element variability program 104 tracks variations of instruction elements in instruction sets of a given type whereby two or more instruction elements always occur at a particular point interchangeably (i.e., one of the two or more instruction elements occurs at the particular point, but not more than one per instruction set of the given type). For example, instruction element variability program 104 determines that recipes that produce a certain dish type always have an action involving two instruction elements, whisk and X, where X is always milk, cream, soymilk, etc. Through a machine learning model, instruction element variability program 104 deduces that all of the values for X are equivalents and updates equivalent element database 106 with this data.

FIG. 2 illustrates operational processes 200 for establishing one or more thresholds of variability for instructional elements in instruction element database 106, on a computing device within the environment of FIG. 1, in accordance with an exemplary embodiment of the present invention.

In step 204, instructional element variability program 104 (hereafter referred to as "program 104") determines a degree to which instruction elements are varied within a plurality of instruction sets such as those contained within instruction element database 106. The plurality of instruction sets are a group of instruction sets characterized within instruction element database 106 as providing a substantially similar type of outcome.

In various embodiments, program 104 analyzes instruction element database 106 and trains a classifier for each instruction set type. In one embodiment, instruction element database 106 is a corpus of recipes tagged with a dish type, a dish ontology, an ingredient ontology, and a cooking verb ontology. In this embodiment, program 104 trains a classifier for each dish type by parsing recipe names in instruction element database 106. In training the classifier, program 104 takes into consideration combinations of words and their order as well as the individual words themselves. For example, program 104 does not characterize an ice cream sandwich as a typical sandwich because an ice cream sandwich is not customarily included in the type of food characterized as a sandwich.

In various embodiments, program 104 parses the instruction elements in each instruction set to further train the classifier. In the embodiment described above, program 104 parses individual ingredients and steps for a dish type and calculates the probability that each ingredient occurs in that dish type. This is done at varying levels of specificity. For example, an ingredient is characterized as chicken or beef, or characterized more broadly as "meat." For example, a given dish type requires meat, but the meat can be a wide variety of types of meat.

In various embodiments, program 104 breaks down the text of the instructions in the instruction sets to form actions and sequences of actions. In an example for an instruction set showing how to shampoo hair, one instruction is "apply shampoo and lather," which program 104 breaks down into two actions: 1) apply the shampoo and 2) lather the shampoo. Once the steps in a plurality of instruction sets are broken down into actions, the actions and sequences of actions are stored on instruction element database 106 and tagged with a type of outcome. The actions are grouped using an action-type hierarchy.

The instruction sets include instructions pertaining to any type of subject matter. In various embodiments, the instruction sets include processes within a collection of such processes in a corpus that produce tangible outcomes such as, but not limited to, cleaning instructions, assembly instructions, recipes for food dishes, instructions for DIY improvements, instructions for arts and crafts products, instructions for writing software, procedures for making chemical compounds, procedures for obtaining biological data, etc.

The degree to which the instruction elements in instruction element database 106 are varied is determined by program 104 via an analysis of the presence of the instruction elements in instruction element database 106 and depends, at least in part, on the outcome type (e.g., descriptor), which characterizes the plurality of instruction sets. For example, an analysis of instructions in a corpus of instructions for designing a vehicle of the type "sport-utility vehicle" (SUV) shows that the incorporation of four-wheel drive capability is varied to an insignificant degree (i.e., four-wheel drive capability is present in a significant majority of SUVs). In contrast, an analysis of instructions in a broader corpus for designing a vehicle of the type "car" shows that the incorporation of four-wheel drive capability is varied to a significant degree (i.e., four-wheel drive capability is present in a significant number of cars and absent in a significant number of cars). In some embodiments, an analysis for the absence of an instruction element within a corpus of instructions is also performed by program 104 when it is logical to do so. For example, since four-wheel drive capability is incorporated in the design of vehicles of the type "car" to varying extents, it is logical for program 104 to analyze and record the absence of four-wheel drive capability for design instructions in all sub-types of cars. Thus, program 104 determines that the absence of four-wheel drive is varied to an insignificant extent in the design instructions for a sports car type vehicle.

In step 206, program 104 ranks the instruction elements as more critical the less they are varied and less critical the more they are varied within instruction element database 106. In various embodiments, the higher the percentage of a given instruction element in instruction sets within instruction element database 106 having a substantially similar outcome description, the lower the given instruction element variability and the higher the given instruction element criticality.

In step 208, program 104 establishes one or more thresholds of variability for instruction elements in instruction sets within instruction element database 106 having a substantially similar outcome description. In one embodiment, the variability threshold is "always present" or "not always present." In this embodiment, an instruction element (or a substantially equivalent instruction element) is always present in a given set of instruction sets having a substantially similar outcome description within instruction element database 106 in order to be considered critical. In other words, the absence of the instruction element or equivalent in even one instruction set within instruction element database 106 indicates that the instruction element can be missing in an instruction set that is characterized as having a substantially similar outcome description as other instruction sets that include that instruction element. Therefore, the instruction element is not critical because it is not essential.

In other embodiments, program 104 utilizes a percentage threshold of variability to determine an instruction element criticality. For example, if an instruction element is present in greater than ninety percent of instruction sets categorized in instruction element database 106 as having a substantially similar outcome description, then that instruction element is "critical." If the instruction element is present in seventy to ninety percent of the instruction sets, it is "somewhat critical" and if the instruction element is present in less than seventy percent of the instruction sets, it is "not critical." In various embodiments, a percentage threshold of variability and its relationship to instruction element criticality varies with instruction set outcome description. In various embodiments, a threshold of variability (percentage or not) is input by one or more users.

In other embodiments, thresholds of variability within instruction element database 106 are defined not on a single instruction element, but on sequences of instruction elements. For example, in a soufflé, the ingredients must first be mixed, then baked. Variation of this sequence, even though the instruction elements are the same, leads to a dish that does not conform to what is accepted as a soufflé within instruction element database 106. In this example, variability thresholds can also be applied separately to recipe ingredients and to recipe step sequences.

Figure 3:
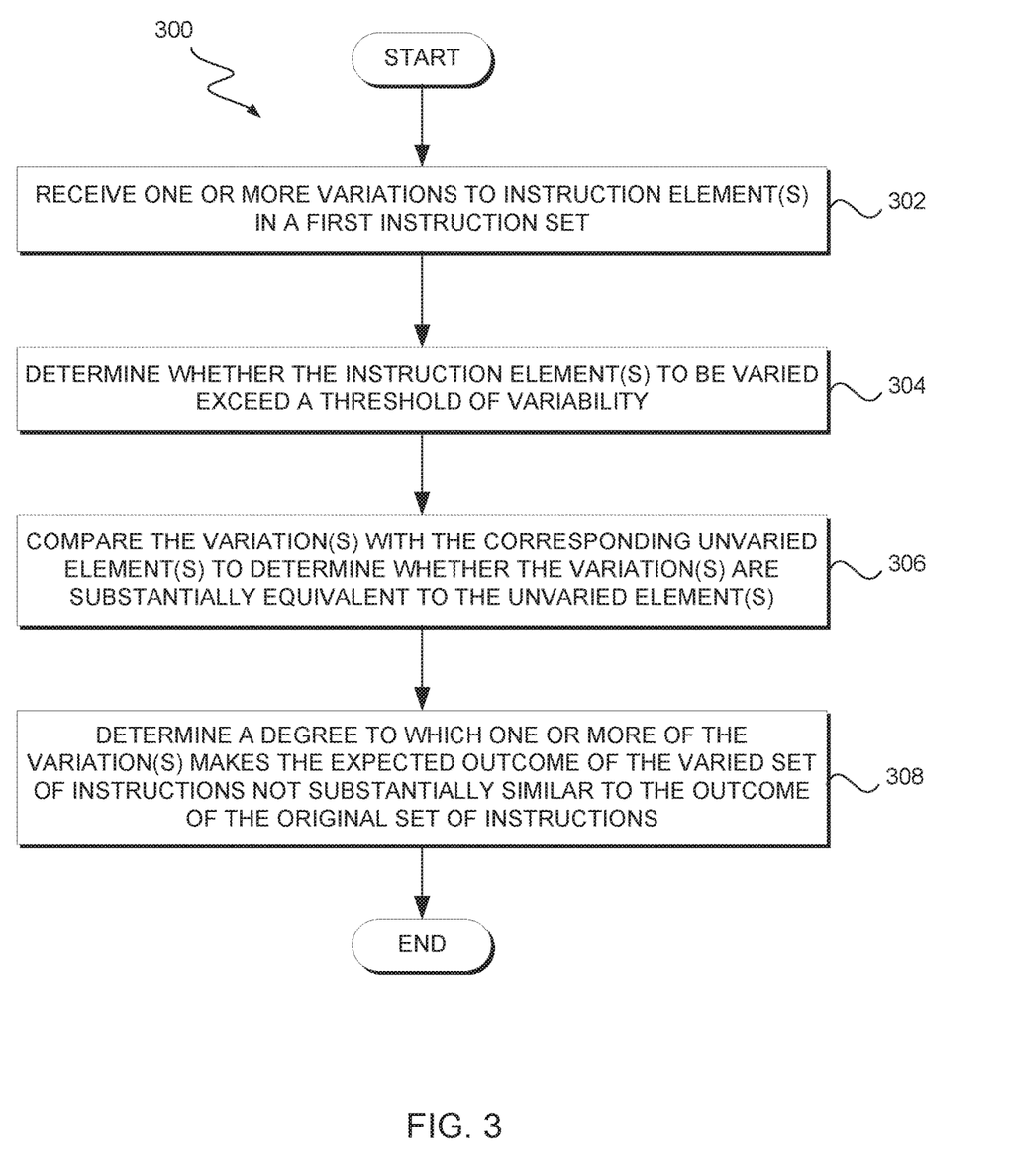
FIG. 3 illustrates operational processes for determining a degree to which one or more variations in instructional elements makes the expected outcome of a varied set of instructions not substantially similar to the outcome of the unvaried set of instructions, on a computing device within the environment of FIG. 1, in accordance with an exemplary embodiment of the present invention.

FIG. 3 illustrates operational processes 300 for determining a degree to which one or more variations in instructional elements within instruction element database 106 makes the expected outcome of a varied set of instructions not substantially similar to the outcome of the unvaried set of instructions, on computing device 102 within the environment of FIG. 1, in accordance with an exemplary embodiment of the present invention.

In step 302, program 104 receives one or more variations to instruction element(s) in a first instruction set either by a user or automatically. In various embodiments, the one or more variations are input by one or more users. For example, a user wanting to experiment with a cookie recipe inputs variations of that cookie recipe wherein the ingredients and/or cooking instructions are varied. In other embodiments, the one or more variations are generated automatically by program 104.

In step 304, program 104 determines whether the instruction element(s) to be varied exceed a threshold of variability. In various embodiments, program 104 breaks down the steps of the varied instruction set into actions and searches the actions in instruction element database 106 that are tagged by the same outcome type as the instruction set being varied.

Depending on the threshold criteria, program 104 determines the criticality of the instruction element being varied for the instruction set.

In step 306, program 104 compares the one or more variations to the unvaried instruction element(s) to determine whether any of the one or more variations is substantially equivalent to the unvaried instruction element(s) within instruction element database 106. In various embodiments, program 104 searches for substantially equivalent instruction element(s) to the unvaried instruction element(s) in equivalent element database 108. If a variation to a first instruction element is included in a list of instruction elements that are substantially equivalent to the first instruction element, then program 104 flags the variation as a variation that will not change the outcome type. For example, in the area of recipe variations, equivalent element database 108 includes an ingredient ontology and cooking action ontology. Thus, program 104 determines that an equivalent to "eggs" in a recipe is "egg whites" and "egg substitute." In another example, program 104 determines that an equivalent to "bake" is "cook in an oven."

In step 308, program 104 determines a degree to which one or more of the variation(s) makes the expected outcome of the varied set of instructions not substantially similar to the outcome of the original set of instructions. To make this determination program 104 analyzes at least two conditions: 1) did an instruction element that was varied exceed the threshold of variability? (i.e., is the instruction element too critical to be varied?); and 2) was the variation substantially equivalent to the original instruction element? If the answer to 1) is no, then the instruction element may be varied without changing the outcome type of the instruction set. If the answer to 1) is yes, then the determination of whether the instruction element can be varied depends on whether the answer to 2) is yes or no. In this scenario, if the answer to 2) is yes, then the variation may be made without changing the outcome type. However, if the answer to 2) is no, then the variation will change the outcome type of the instruction set.

In various embodiments, step 306 is only executed by program 104 for a variation of an instruction element if program 104 determines that the instruction element to be varied exceeds the threshold of variability in step 304.

Figure 4:
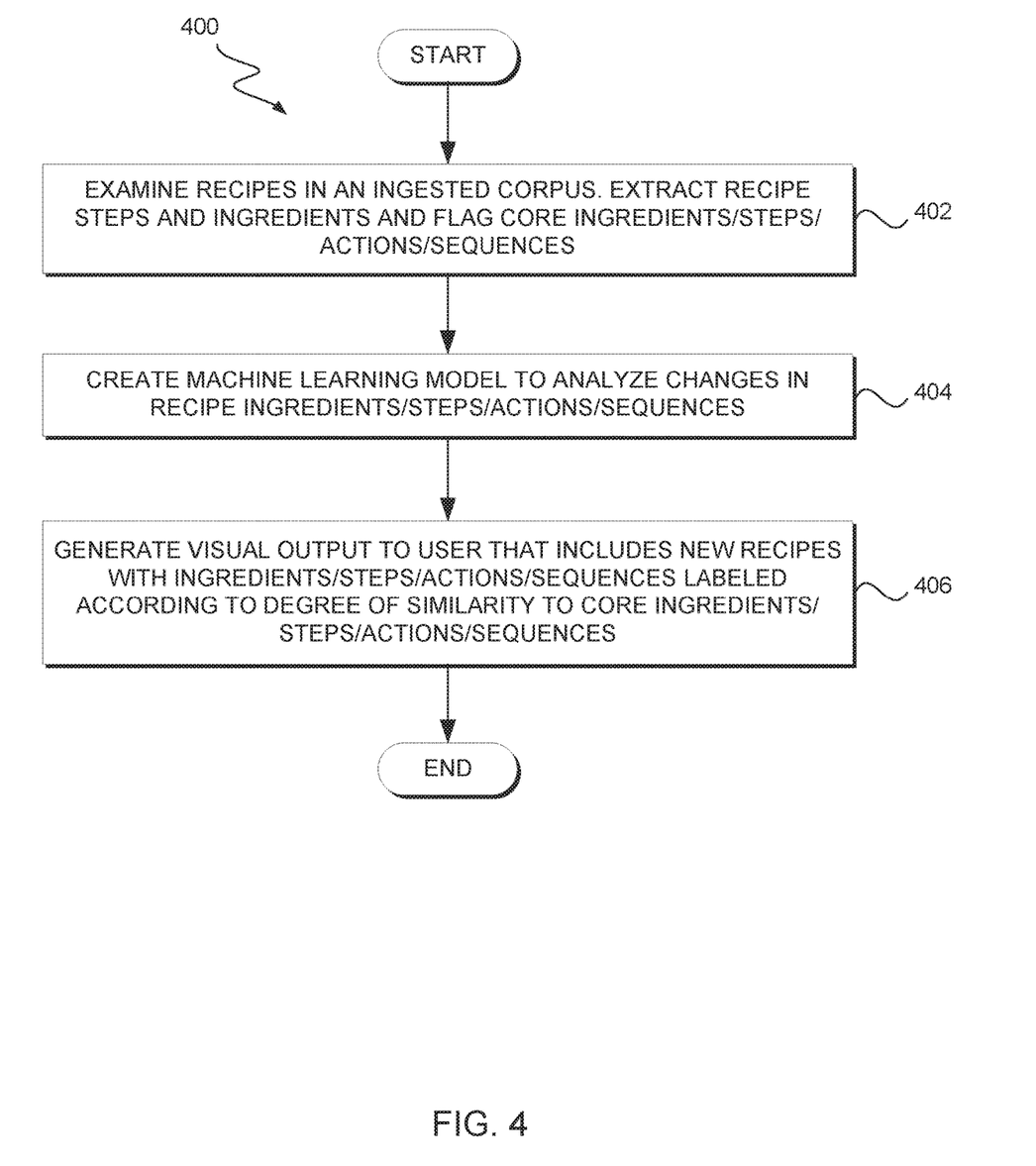
FIG. 4 illustrates an example for examining recipes to create a machine learning model and generate a visual output that includes new recipes labeled according to similarity to core ingredients/steps/actions/sequences.

FIG. 4 illustrates an example 400 for examining recipes to create a machine learning model and generate a visual output that includes new recipes labeled according to similarity to core ingredients/steps/actions/sequences.

In step 402, program 104 examines all recipes in an ingested corpus such as the CHEF WATSON codebase and extracts the recipe steps and ingredients. The combination of a step and an ingredient forms an action that connects the step and ingredient (e.g., "add milk and whisk" becomes the action "whisk in the milk"). The combination of steps form sequences. Program 104 tags the ingredients/steps/actions/sequences by dish type and stores the data in instruction element database 106 as tagged groups. In various embodiments, ingredients/steps/actions/sequences that occur with a high probability in a particular dish (i.e., ingredients/steps/actions/sequences that are present in most if not all of the recipes with a particular tag) are flagged as "core" ingredients/steps/actions/sequences. In some embodiments and scenarios, core ingredients/steps/actions/sequences are indicated in an output of a recipe by indicators such as color, font, typeface, etc. For example, in an output of a recipe, the core ingredients/steps/actions/sequences are indicated by red.

In step 404, program 104 creates a machine learning model that analyzes changes in recipe ingredients/steps/action/sequences. If the changes do not involve core ingredients/steps/actions/sequences, then the dish type remains intact. In various embodiments, a classifier is trained for various dish types using features based on core ingredients/steps/actions/sequences. A varied recipe that conforms to the dish type is then fed to the classifier, which then updates instruction element database 106.

In step 406, program 104 generates a visual output that includes new recipes that indicate possible variations in one or more of ingredients, steps/actions, and sequences of preparation steps for the original dish type. In one embodiment, program 104 indicates a probability with one or more of the ingredients, steps/actions, and sequences of preparation steps, thereby indicating the amount, e.g. a result of a statistical analysis, by which inclusion of that ingredient, steps/action, or sequences of preparation steps will alter the recipe from an average recipe for the original dish type. In some embodiments, program 104 includes an algorithm that outputs a color code to indicate whether the modified recipe remains true to the original dish type. In other words, program 104 generates a visual indication, e.g. a visual output shown on a display of a computing device, which is shown to a user and indicates whether the modified recipe remains true to the original dish type. For example, a graphical or text output representing the modified dish becomes red as the core ingredients/steps/actions/sequences remain unaltered or only changed by substitution with a substantially equivalent replacement (e.g., milk is replaced by cream). In this example, a graphical or text output representing the modified dish becomes blue as the core ingredients/steps/actions/sequences are altered by substitution with replacement ingredients/steps/actions/sequences that are not substantially equivalent replacements (e.g., milk is replaced by water). In other embodiments, program 104 highlights the ingredients/steps/actions/sequences that are modifiable without affecting dish type by, for example, color coding. In some embodiments, the color coding is associated with ingredients/steps/actions/sequences weights from the machine learning algorithm. In some embodiments, program 104 includes new recipes as part of an online collection of such new recipes, i.e. as part of a recipe collection that is only accessible by a computing device connected to the Internet. In some embodiments, a given recipe is actively refined based on new data retrieved from the internet such that more popular changes in the new recipe are included that recipe. In some such scenarios, popular changes in a recipe are only identifiable based on feedback that only exists in a database associated with a given recipe. For example, a user leaves feedback for a new recipe that identifies a modification to that recipe. The modification id replicated by others and feedback regarding that modification indicates that the popularity of the modification is above a threshold. As such, a modified new recipe for that dish, as generated by program 104, includes the modification provided by the user. As such, in this manner and in an embodiment, the new recipe is, via program 104, responsive to shifts in public opinion. In some embodiments, online opinions and feedback are continuously monitored, i.e. twenty four hours a day, such updates to a new recipe are made as the data to support such a modification is made available.

Figure 5:
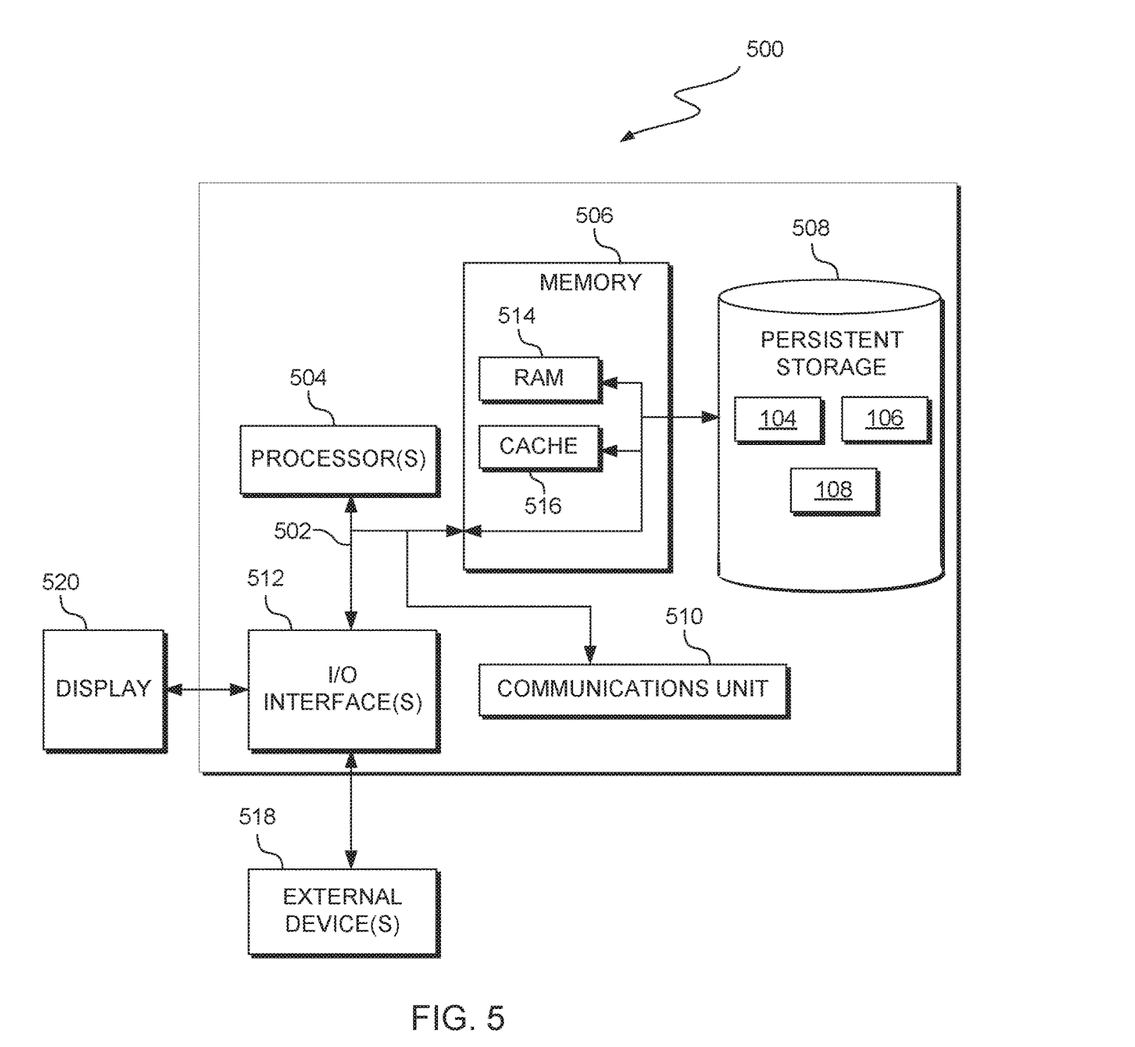
FIG. 5 depicts a block diagram of components of the computing device executing an instruction element variability program, in accordance with an exemplary embodiment of the present invention.

FIG. 5 depicts a block diagram, 500, of components of computing device 102, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Instruction element variability program 104, instruction element database 106, and equivalent element database 108 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 112. In these examples, communications unit 510 includes one or more network interface cards. Communications unit 510 may provide communications through the use of either or both physical and wireless communications links. Instruction element variability program 104, instruction element database 106, and equivalent element database 108 may be downloaded to persistent storage 508 through communications unit 510.

I/O interface(s) 512 allows for input and output of data with other devices that may be connected to computing device 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., instruction element variability program 104, instruction element database 106, and equivalent element database 108, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk," "CHEF WATSON," and the like may be subject to trademark rights in various jurisdictions throughout the world and are used here only in reference to the products or services properly denominated by the marks to the extent that such trademark rights may exist.

What is claimed is:

1. A computer program product comprising:
one or more computer-readable storage media and program instructions stored on at least one of the one or more computer-readable storage media, the program instructions comprising:
program instructions to determine a set of core elements that are required for a first recipe to yield a type of food;
program instructions to receive a variation to the first recipe;
program instructions to determine whether the variation alters the type of food that is produced by execution of the recipe; and
program instructions to generate a visual display that indicates whether the type of food is produced by execution of the first recipe using the variation.

2. The computer program product of claim 1, wherein the program instructions to determine a set of core elements that are required for a first recipe to yield a type of food further comprises:
program instructions to analyze a database that includes a plurality of recipes tagged with one or more of: a dish type, a dish ontology, an ingredient ontology, and a cooking verb ontology, wherein an analysis includes one or both of:
program instructions to parse one or more of: recipe names, ingredients and steps;
and
program instructions to train a classifier to understand one or more meanings attributable to one or more words and combinations of words.

3. The computer program product of claim 2 further comprising:
program instructions to break a plurality of instruction text to form one or more actions and sequences of actions;
program instructions to tag the one or more actions and sequences of actions with the type of food; and
program instructions to group the one or more actions using an action-type hierarchy.

4. The computer program product of claim 3 further comprising:
program instructions to rank the one or more ingredients, steps, actions, and sequence of actions as more critical the less the one or more ingredients, steps, actions, and sequence of actions are varied within the plurality of recipes and less critical the more the one or more ingredients, steps, actions, and sequence of actions are varied within the plurality of recipes; and
program instructions to establish one or more thresholds of variability for the one or more ingredients, steps, actions, and sequence of actions.

5. The computer program product of claim 1, wherein the program instructions to determine whether the variation alters the type of food that is produced by execution of the recipe further comprises:

program instructions to determine whether the variation exceeds a threshold of variability; and program instructions to determine whether the variation is substantially equivalent to one or both of: a step or an ingredient to which it was applied.

6. The computer program product of claim 1 further comprising:

responsive to a determination that the variation has not changed one of the core elements of the first recipe, program instructions to determine that the variation does not alter the type of food generated by execution of the first recipe.

7. The computer program product of claim 1 further comprising:

program instructions to generate a visual display that indicates one or more types of food that can be produced based, at least in part, the one or more of ingredients, tools, and techniques that are available to the user.

8. A computer system comprising:

one or more computer processors;

one or more computer-readable storage media; and program instructions stored on at least one of the one or more computer-readable storage media for execution by at least one of the one or more processors, the program instructions comprising:

program instructions to determine a set of core elements that are required for a first recipe to yield a type of food;

program instructions to receive a variation to the first recipe;

program instructions to determine whether the variation alters the type of food that is produced by execution of the recipe; and program instructions to generate a visual display that indicates whether the type of food is produced by execution of the first recipe using the variation.

9. The computer system of claim 8, wherein the program instructions to determine a set of core elements that are required for a first recipe to yield a type of food further comprises:

program instructions to analyze a database that includes a plurality of recipes tagged with one or more of: a dish type, a dish ontology, an ingredient ontology, and a cooking verb ontology, wherein an analysis includes one or both of:

program instructions to parse one or more of: recipe names, ingredients and steps;

and program instructions to train a classifier to understand one or more meanings attributable to one or more words and combinations of words.

10. The computer system of claim 9 further comprising:

program instructions to break a plurality of instruction text to form one or more actions and sequences of actions;

program instructions to tag the one or more actions and sequences of actions with the type of food; and program instructions to group the one or more actions using an action-type hierarchy.

11. The computer system of claim 10 further comprising:

program instructions to rank the one or more ingredients, steps, actions, and sequence of actions as more critical the less the one or more ingredients, steps, actions, and sequence of actions are varied within the plurality of recipes and less critical the more the one or more ingredients, steps, actions, and sequence of actions are varied within the plurality of recipes; and program instructions to establish one or more thresholds of variability for the one or more ingredients, steps, actions, and sequence of actions.

12. The computer system of claim 8, wherein the program instructions to determine whether the variation alters the type of food that is produced by execution of the recipe further comprises:

program instructions to determine whether the variation exceeds a threshold of variability; and program instructions to determine whether the variation is substantially equivalent to one or both of: a step or an ingredient to which it was applied.

13. The computer system of claim 8 further comprising:

responsive to a determination that the variation has not changed one of the core elements of the first recipe, program instructions to determine that the variation does not alter the type of food generated by execution of the first recipe.

* * * * *